(12) United States Patent
Gregg et al.

(10) Patent No.: US 7,290,077 B2
(45) Date of Patent: Oct. 30, 2007

(54) EVENT QUEUE STRUCTURE AND METHOD

(75) Inventors: Thomas A. Gregg, Highland, NY (US);
Richard L. Arndt, Austin, TX (US);
Bruce L. Beukema, Hayfield, MN
(US); David Craddock, New Paltz, NY
(US); Ronald E. Fuhs, Rochester, MN
(US); Steven L. Rogers, Rochester,
MN (US); Donald W. Schmidt, Stone
Ridge, NY (US); Bruce M. Walk,
Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 11/100,838

(22) Filed: Apr. 7, 2005

(65) Prior Publication Data
US 2006/0230209 A1    Oct. 12, 2006

(51) Int. Cl.
G06F 13/24 (2006.01)
G06F 3/00 (2006.01)
G06F 13/40 (2006.01)
(52) U.S. Cl. ........................ 710/263; 710/52
(58) Field of Classification Search ............. 710/52, 710/263
See application file for complete search history.

(56) References Cited

U.S. PATENT DOCUMENTS 6,185,613 B1 *   2/2001  Lawson et al. ............ 709/224
6,622,193 B1     9/2003  Avery
6,718,370 B1     4/2004  Coffman et al.
6,760,783 B1     7/2004  Berry
7,047,322 B1 *   5/2006  Bauman et al. .............. 710/6
2002/0083244 A1* 6/2002  Hammarlund et al. ...... 710/107
2002/0141424 A1 10/2002 Gasbarro et al.
2002/0144001 A1 10/2002 Collins et al.
2003/0065856 A1* 4/2003  Kagan et al. ................ 710/263
2003/0084241 A1  5/2003  Lubbers et al.
2004/0028043 A1  2/2004  Maveli et al.
2004/0030745 A1  2/2004  Boucher et al.
2004/0049580 A1* 3/2004  Boyd et al. ................. 709/226
2004/0095949 A1* 5/2004  Elzur ........................ 370/412
2004/0120332 A1* 6/2004  Hendel ...................... 370/411
2004/0139240 A1  7/2004  DiCorpo et al.
2004/0202189 A1 10/2004  Arndt et al.
2004/0215848 A1 10/2004  Craddock et al.

\* cited by examiner

Primary Examiner—Paul R. Myers
Assistant Examiner—Ryan M Stiglic
(74) Attorney, Agent, or Firm—John E. Campbell

(57) ABSTRACT

An information processing system is provided which includes a plurality of system resources, and an event queue having a maximum number of entries. An event recording mechanism of the information processing system is operable to make entries regarding events in the event queue, wherein the entries are limited to a predetermined number of active entries in the event queue per each type of event per each of the system resources. In a particular embodiment, the number of entries per each type of event for each of the system resources is limited to one.

17 Claims, 3 Drawing Sheets

EVENT QUEUE STRUCTURE AND METHOD

BACKGROUND OF THE INVENTION

The present invention relates to information processing systems, and more particularly to a structure and method for queuing events associated with an information processing system.

InfiniBand architecture is followed in many system area networks for connecting servers together to other servers and remote storage subsystems. The architecture is based on a serial switch fabric that resolves scalability, expandability, and fault tolerance limitations of a shared bus architecture through the switches and routers of the switch fabric.

InfiniBand architecture is implemented where appropriate for providing better performance and scalability at a lower cost, lower latency, improved usability and reliability. The architecture addresses reliability by creating multiple redundant paths between nodes. It represents a shift from the load-and-store-based communications methods using shared local I/O busses of the past to a more fault tolerant message passing approach.

FIG. 1 is a prior art diagram illustrating a system area network utilizing Infiniband network architecture. The network shown in FIG. 1 utilizes system clustering in which two or more servers are connected together as a logical server at each processor node 110 for better performance and scalability at lower cost. As further shown in FIG. 1, the network has a switch fabric 125 including three switches 120 which connect processor nodes 110 and input output (I/O) subsystem nodes 130 together. As further shown in detail in FIG. 2, two processor nodes 200 and 201 function as processor nodes 110 (FIG. 1) of a server area network. The processor nodes support consumers 150 and each includes a network adapter, e.g., a host channel adapter ("HCA") 140, one or more queue pairs ("QPs") 210 or 211 and one or more ports 260 or 261 for communication. A consumer can be defined as a user of verbs. Verbs are abstract descriptions of channel adapter behavior. I/O subsystem nodes 130 contain target channel adapters ("TCAs") 150. Like processor nodes, each I/O subsystem node also includes one or more QPs and one or more ports and I/O controllers (not shown).

Each processor node 110 and each I/O subsystem node 130 connects to the switch fabric 125 through its respective HCA or TCA. Host and target channel adapters provide network interface services to overlying layers to allow such layers to generate and consume messages which include packets, as well as other types of communications. When an application running on a processor node writes a file to a storage device, the HCA 140 of that processor node generates the packets that are then consumed by a storage device at one of the I/O subsystem nodes 130. Between the processor node and the I/O subsystem nodes, switches 120 route packets through the switch fabric 125. Switches 120 operate by forwarding packets between two of the switch's ports according to an established routing table and based on addressing information in the packets.

FIG. 2 is a prior art diagram further illustrating principles of communications in accordance with InfiniBand architecture. An application active on a first processor node 200 may require communication with another application which is active on a second processor node 201 remote from the first processor node 200. To communicate with the remote application, the applications on both processor nodes 200, 201 use work queues. Each work queue is implemented by a pair of a queues, i.e., a "queue pair" ("QP") 210 or 211, which includes a send work queue and a receive work queue.

An application drives a communication operation by placing a work queue element (WQE) in the work queue. From the work queue, the communication operation is handled by the HCA. Thus, the work queue provides a communications medium between applications and the HCA, relieving the operating system from having to deal with this responsibility. Each application may create one or more work queues for the purpose of communicating with other applications or other elements of the system area network.

Event handling is a major part of controlling communications between nodes. The manner in which event handling is performed ultimately affects both the scalability and performance of a system area network. The InfiniBand architecture specification describes concepts of events and event records for reporting certain types of events and errors. In networks having few resources, the problem of determining which system resource causes a call to an event handler such as a completion event handler or an error event handler is trivial. Both of the event handlers could be called when any system resource has an event and then the event handlers would scan all of the system resources to determine which of the system resources generated the event. While suitable for networks having few resources, this approach does not scale up well for networks having large numbers of system resources.

On the other hand, in networks involving large numbers of system resources, merely maintaining a centralized event table in main memory for each of the thousands of resources of the system does not lead to satisfactory results. Such table would have to be very large in order to allow events to be recorded therein for all of the resources of the system. Typically, entries can be no smaller than a byte since this is the smallest atomic memory operation in most large servers, in that memory operations which set individual bits are not supported. When a resource has an event, the HCA would write the corresponding byte in the event table indicating that the resource has pending work, and then the handler would be called. Accordingly, scan times would still be long. In addition, if a particular resource has one or more active entries in the table at one time for the same type of event, unnecessary double-handling of the same event could result, unless the event handler is required to scan the entire table first to determine all instances of the same type of event involving the same resource before proceeding. Applying this approach to a system having thousands of resources involves a large amount of time to search the table for events and would be an ineffective and undesirable way of handling the problem. Event queues used in particular implementations of InfiniBand architecture allow scaling to large numbers of resources by eliminating the need to scan individual resources of a system. However, event queue designs at present fail to adequately curtail the amount of time required for event handlers to search them.

Consequently, a new way of handling event records is desirable that can optimize scalability without impacting processing time.

SUMMARY OF THE INVENTION

According to one aspect of the invention, an information processing system is provided which includes a plurality of system resources, and an event queue having a maximum number of entries. An event recording mechanism of the information processing system is operable to make entries regarding events in the event queue, wherein the entries are limited to a predetermined number of active entries in the event queue per each type of event per each of the system resources. In a particular embodiment, the number of entries per each type of event for each of the system resources is limited to one.

According to another aspect of the invention, a method is provided for processing events in an information processing system including a plurality of system resources. According to such aspect of the invention, an event queue is provided which has a maximum number of entries. Entries are recorded in the event queue regarding events, wherein the entries are limited to a predetermined number of active entries in the event queue per each type of event per each of the plurality of system resources. Again, in a particular embodiment, the number of entries per each type of event for each of the system resources is limited to one.

According to a particular aspect of the invention, the predetermined number of active entries in the event queue assure that the event recording mechanism cannot overrun a location in the event queue at which entries are consumed from the event queue.

According to yet another aspect of the invention, an information processing system is provided which includes a plurality of system resources, a first event queue and a second event queue. An event recording mechanism operable in a first mode to make entries regarding first types of events in the first event queue, and is operable in a second mode to make entries regarding the first types of events in a second event queue, the second event queue preserving a time order in which the events are recorded as occurring.

DETAILED DESCRIPTION

The present invention provides for a structure and method for handling event records, particularly for system area networks implemented, in accordance with InfiniBand architecture ("IBA"), such that scalability is optimized without sacrificing processing time. As mentioned earlier, IBA defines several types of events and also several types of errors. In accordance with the present invention, events are recorded in event queues (EQs). In one embodiment of the present invention, a FIFO scheme is used, in which the size of the EQ is limited to the product of the number of types of events and the number of resources that are supported by the EQ, as will be discussed in more detail below. In addition, according to one embodiment, events can be identified by several mechanisms, and a special event queue can be defined for super-privileged events.

In accordance with one embodiment of the invention, event queues are provided in which only sufficient space is allotted therein to record one event of each type for each tracked resource of the system. This makes it easier and faster to navigate the EQ. It also eliminates EQ overruns because one can never exceed the number of allocated entries on the table. In addition, EQ indexes do not have to be passed between the HCA and an HCA driver ("HCAD") used as the event handling mechanism.

In this way, the event handling mechanism (i.e. the HCAD) keeps a base index so it knows which EQ entry to service next. The HCAD will service each EQ entry in turn. The HCAD searches the EQ for valid entries starting from this index. The EQ is circular in this way and works in a manner similar to a FIFO queue.

Figure 4:
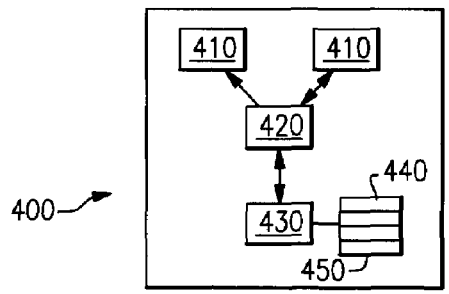
FIG. 4 is a diagram illustrating notification flow of an HCA in accordance with an embodiment of the invention.

In a basic form as shown in FIG. 4, an information processing system 400 includes a plurality of system resources 410, an event handler 420 and an event recording mechanism 430. The event handler is operable to handle events generated for the plurality of system resources provided. The event recording mechanism is operable to record events of different types for the plurality of system resources. The events will be recorded as entries 440 on an event queue (EQ) 450. The size of the EQ must be large enough to contain the total number of events for all associated HCA resources. These concepts will be explained in further detail as relating to IBA after some basic concepts about the way IBA events and errors are handled is further explored.

Figure 3:
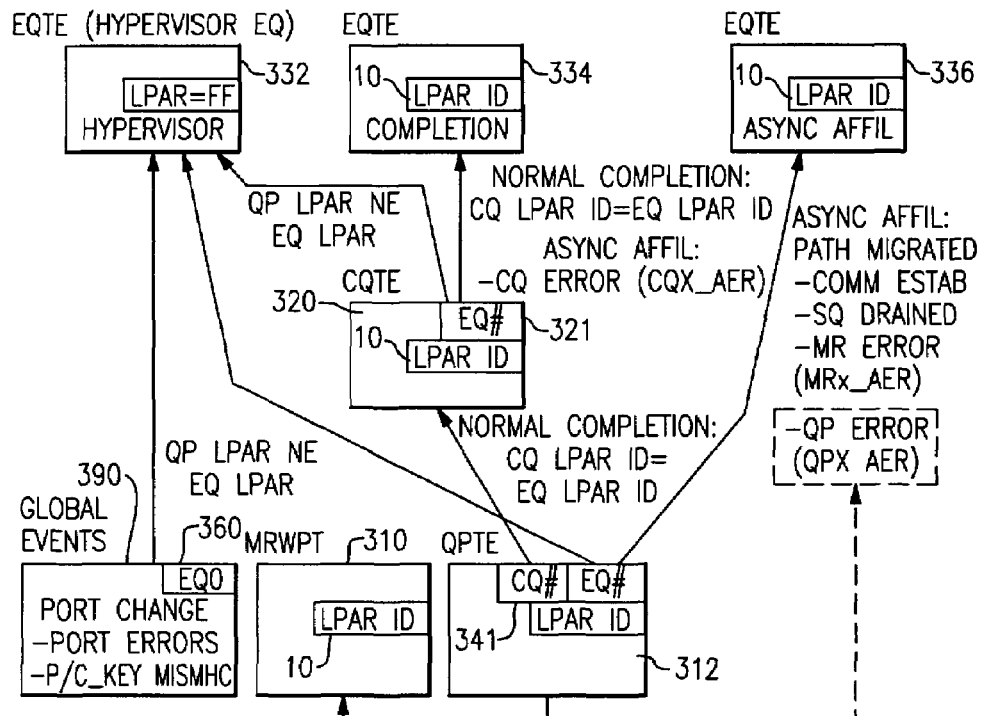
FIG. 3 is a block and schematic diagram illustrating a structure of an information processing system in accordance with an embodiment of the invention.
Figure 5:
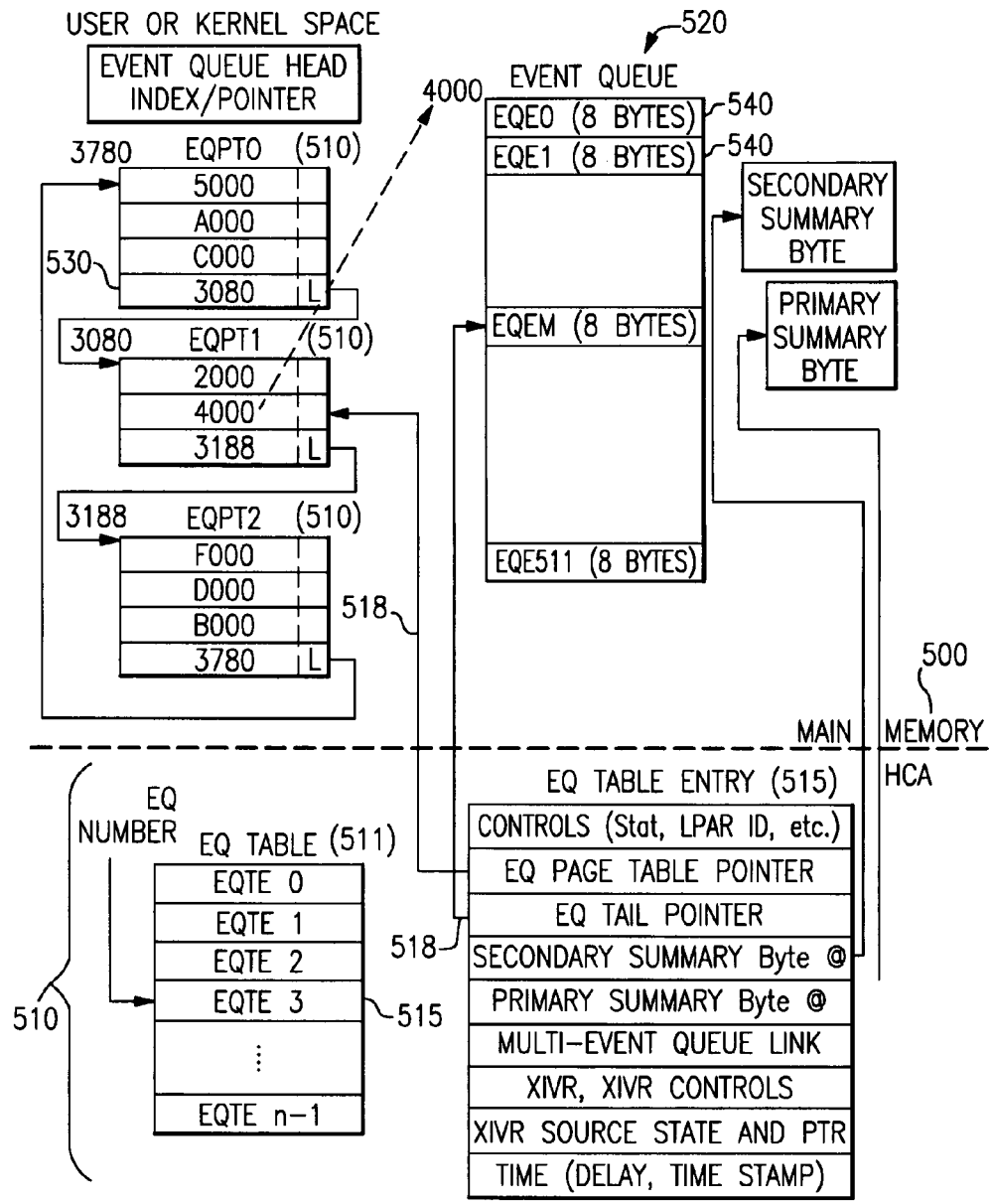
FIG. 5 is a diagrammatic view illustrating an implementation of event queues within an information processing system in accordance with an embodiment of the present invention.

FIG. 5 is a diagram illustrating an HCA notification flow in accordance with an embodiment of the invention. In such embodiment, a processor node is configured as a plurality of logical partitions ("LPARs"). In each LPAR an instance of an operating system (for example, z/OS®, LINUX, AIX®, UNIX®, etc.) is configured to operate. z/OS and AIX are registered trademarks of International Business Machines Corporation and UNIX is a registered trademark of Unix System Laboratories. While the embodiment shown in FIGS. 3-5 shows an implementation of the invention for IBA, the concepts herein can be implemented for other architectures.

Referring again to FIG. 3, each of the boxes 310, 312, 320, 332, 334, 336, and 390 represents an HCA resource and each resource has an identifier associated with it. The arrows represent the flow of various events and errors from resource to resource, eventually generating event queue entries (EQEs). In the embodiment shown in FIG. 3, the identifier for each resource is an LPAR ID (10) identifying the particular logical partition which owns the resource. Generally, such identifier is assigned and maintained via a hypervisor in a super-privileged area of a resource table. A hypervisor is a manager or controller of super-privileged system resources. Generally, a hypervisor has higher authority to manage system resources than any operating system image running on a processing node. When any operating system image requires a system resource, e.g., access to a super-privileged table, or a data structure, etc, the operating system must acquire access to such resource from the hypervisor.

As mentioned earlier, IBA defines several types of events and also several types of errors. In the present invention, errors are recorded as events on an event queue (EQ). Before discussing the flow of FIG. 4 any further, it may be useful to discuss the type of events and errors that are being handled herein with respect to the EQ.

There are two types of events identified currently in IBA. The first type of events are completion events. Consumers may poll completion queues (CQs) looking for completed WQEs using a "Poll for Completion" verb. In the case when the CQ is empty and the consumer process is blocked, consumers cannot continually poll, so IBA provides an 'interrupt' mechanism. First, the consumer registers a completion event handler, by using a "Set Completion Event" handler verb. Once the completion event handler is set, the consumer can then request an 'interrupt' using a "Request Completion Notification" verb. This allows the process to be blocked until the next CQE is put on the CQ. When the CQ is requested to call the completion event handler, it puts an entry on the associated EQ.

A second type of event is an affiliated asynchronous event. Three affiliated asynchronous events are defined by IBA for each queue pair (QP). For the consumer to be 'interrupted' when these events occur, it must first register an event handler using the "Set Asynchronous Event" handler verb. Shared receive queues provide a single affiliated asynchronous event ("SRQ Limit"). The events for regular QPs are: path migrated event; communication established; and send queue drained.

In addition to events, IBA also defines errors. Errors are defined mainly as affiliated and unaffiliated asynchronous errors. The same asynchronous event handler registered for affiliated asynchronous events is also used for asynchronous errors. The affiliated asynchronous errors are as follows:

A CQ error signals a problem associated with the CQ. A CQ error is affiliated with a CQ.

A local work queue catastrophic error occurs when the QP attempts to write a CQ associated to it when the CQ is full.

A path migration request error indicates that an incoming path migration request was not honored. This error is affiliated with either a QP or an EE context.

The unaffiliated asynchronous errors are errors that cannot be affiliated with any particular HCA resource. These errors are registered in the hypervisor's EQ and are mainly defined as port errors.

Additional events and errors going beyond those specified by IBA are defined in a similar way. These additional errors and events are provided as follows:

A protection table error occurs when the HCA has a problem accessing or manipulating protection tables. Such error is affiliated with the index portion of the L_Key or R_Key.

The LPAR Access error occurs when the LPAR ID of a particular resource references a resource with a different LPAR number. When a QP tries to access a CQ that does not have the same LPAR ID, the QP is put into the error state and an EQ entry is made. When a CQ tries to access an EQ that does not have the same LPAR ID, the CQ is put into the error state and an EQ entry is made.

The following types of errors: P/Q_Key mismatch, link integrity error, and buffer overrun error are defined by IBA. In the present embodiment of the invention, these errors are signaled to the hypervisor. The hypervisor then informs the subnet management agent ("SMA"), the support element, and/or the operating system ("OS") through queue pair 0 (QP0), such queue pair being specially designated for communication to and from the hypervisor.

In the case of a sampling mechanism completion event, the statistics gathering sampling mechanism generates an EQE when the sample is finished. Any EQ can be used, but the EQ is expected to be owned by the hypervisor.

Another type of error, "interface trace stopped" signals that the interface trace mechanism has been stopped due to a detected trigger condition.

In the case of an EQ error, the EQ detects an error that is isolated to the single EQ. The hypervisor receives the EQE.

A path migrating event signals that the process of path migration has started and must be completed by the hypervisor.

In the case of an unaffiliated access error, an error occurs while a register is being accessed and the error could not be isolated to any particular resource.

In another event, "first error capture information available" signals that such capture information is available and the hypervisor needs to collect it and rearm the facility.

Other implementation specific events may be added, and the EQ structure is architected to accommodate more types.

Referring again to FIG. 3, with the exception of global events 390, each box represents different HCA resources such as queue pair table entries "QPTEs" 312, memory regions, e.g., memory region window and protection tables ("MRWPTs") 310, and completion queue page table entries "CQTEs 320 and event queue table entries ("EQTEs") 332, 334 and 336. Each resource has an LPAR ID 10, which is located in the super-privileged area of the resources table entry. The arrows represent the flow of various events and errors with the flow starting with the QPTE 312 when it needs to generate a CQE. The CQ number 341 is checked to see if it exists, is not in the error state, and its LPAR ID 10 is valid. If these checks pass, the LPAR ID 10 of the QP is compared with the LPAR ID of the CQ. If they are the same, the CQE is generated and stored into main memory. If notification is requested and the EQ Pending bit 321 in the CQTE 320 is not set, the EQ number is checked to see whether the particular EQ exists. Additional checks verify whether the particular EQ is not in the error state, and its LPAR ID is valid. If these checks pass, the LPAR ID of the CQ is compared to the LPAR ID of the EQ. If they are the same, the EQE is generated and stored into main memory. Then, the rest of the EQ processing is completed. EQ events and errors other than CQ completion events and errors use the EQ number provided in the QPTE.

The hypervisor is assigned EQ0 360 to handle global events 390 such as port unaffiliated event, which signals changes in the port status, a link integrity error, or a buffer overrun error. Other global events reported through EQ0 include port unaffiliated event, which can also signal changes in the port status, a link integrity error, or a buffer overrun error. In addition, the global events: sampling complete, interface trace stopped, and unaffiliated access error; QP error (for when the LPAR ID of the EQ specified in the QP does not match the LPAR ID of the QP or the EQ number does not exist, or when the specified EQ is in error, is disabled, or the LPAR ID is not valid) are reported through EQ0. In a CQ error, the LPAR ID of the EQ specified in the CQ does not match the LPAR ID of the CQ. Alternatively or in addition thereto, this error occurs when the EQ number does not exist, is in error, is disabled, or the LPAR ID is not valid.

Any resources that directly access the specially designated EQ0 (360) for the hypervisor (for example, a hypervisor owned QP, CQ, or MR) must have an LPAR ID designated for the hypervisor. Normal checks concerning the LPAR ID are made regarding any such resources. For events that are not associated with any particular LPAR, for example, "interface trace stopped" error, it is assumed that the event has the unique LPAR ID assigned to the hypervisor.

QP and CQ events directed to the hypervisor's event queue use the QP or CQ number as the resource identifier.

They do not use tokens. If the hypervisor's EQ has an error, the entire HCA enters the error state and raises an error line on the system bus.

FIG. 5 illustrates an implementation of event queues in accordance with an embodiment of the present invention. As shown in FIG. 5, an event queue (EQ) includes two components located in main memory 500. A first component is an event queue page table (EQPT) 510, the function of which is to point to memory pages of the EQ. A second component is the one or more pages 520 of the EQ.

Each entry 540 in a page 520 of the EQ consists of a valid bit, an event or error identifier, and a resource identifier (tokens for QPs and CQs, key indexes for MRs, EQ numbers for EQs, and port numbers for ports). Each EQ holds event queue entries ("EQEs"), the format and content of which are shown in detail in Table 4 below.

Referring to Table 4, in one embodiment of the invention, in each EQE, bit 0 is used as a valid bit, bit 1 is a completion event bit, bits 2 through 7 specify the event or error identifier, bits 8 through 31 identify the QP or CQ number, and bits 32 through 63 are used as a resource identifier. Since each EQ page 520 can hold up to 4 K bytes, using 8 byte EQEs, each page 520 of the EQ holds 512 entries.

The EQPT is in privileged main memory and includes page pointers which point to EQ pages, as indicated by the dashed line pointing to the EQ page "4000". EQPTs are linked in a circular list via link pointers, as indicated by the three link pointers indicated by reference signs "L". The smallest EQPT is 16 bytes and it can have any length, as long as the length is a multiple of 8 bytes. Thus, the HCA can handle EQPTs longer than 4096 bytes. However, the EQPT must start on an 8 byte boundary. The smallest EQ page has to be a full 4096 byte page (512 entries) and it must be naturally aligned.

If the EQPT entry is a link pointer and the link pointer points to another link pointer, the HCA will detect this condition, place the EQ into the error state, and cause an unaffiliated asynchronous error event in the hypervisor's EQ.

The HCAD has a head index or pointer. It uses this index as a starting point to search the EQ for valid entries. However, there is no HCA EQ head index, because there is no requirement for the hardware to detect an overrun of the EQ, as the EQ cannot be overrun. Because of the above-described limit of the number of events of each type that can be recorded in an EQ at one time, the EQ is always large enough to accommodate all of the events that can be recorded therein at one time, eliminating the need to communicate where the software is in consuming events on an event queue.

The HCA (510) also has resources allocated to the EQ. An EQ Table 511 in the HCA has an EQ table entry 515 for each EQ. Each EQ table entry 515 includes information identifying the EQ control register, the address in main memory of the next EQPT entry, the EQ tail pointer, the address in main memory of the secondary summary byte, the address in hypervisor main memory of the primary summary byte, a multi-event queue link when present, the external interrupt vector register ("XIVR") and the XIVR control register, and timing facilities to control hardware interrupts. The valid bits in the EQEs can be defined to be either 0 or 1 depending on the state of the toggle bit.

At this point, it would be beneficial to provide a more detailed discussion of the handling of different types of events and errors in accordance with the embodiment of the invention illustrated in FIG. 5. In the case of completion events, the HCA puts an entry on the CQ and determines whether notification to the HCAD is required by examining the CQ notification control bits of the CQTE and the EQ Pending bit. If the CQ notification control bits indicate that a notification may be generated and the EQ Pending bit is off, then the HCA performs the following notification signaling process and sets the EQ Pending bit in the CQTE. The HCAD logically removes the EQ completion event from the EQ before it resets the EQ Pending bit. The HCAD then notifies the consumer. Setting the EQ Pending bit effectively allows only a single outstanding notification per CQ. If interrupt timers are enabled, completion events cause the HCA to set a "Next Interrupt Time Stamp" and increment the EQ completion event count, both in the EQTE.

In the case of affiliated asynchronous events, three affiliated asynchronous events are defined by IBA, and they are always affiliated with a single QP. These events are path migrated, communication established, and send queue drained. These events are directly tied to an HCA architected QP state, and these states are path migrated, communication established, in which case the packet is received in the Infiniband defined "ready-to-receive" state), as well as send queue drained. In addition to the states, there are control bits that deal with the presentation of the events, i.e., they register the fact that an event was generated. A control bit such as one described in the following must be enabled to allow the hardware to present an event.

Three control bits are set by the HCA and indicate that the EQE has actually been sent to main memory, and that another event of the same type cannot be generated. These control bits thus perform the 'pending' function. Three other control bits (bits 0 through 2) are set by the HCAD to re-enable the corresponding event. The total number of EQ entries required for these events will never exceed three times the number of QPs assigned to the EQ.

IBA defines a few affiliated asynchronous errors. In the present embodiment, several other affiliated asynchronous errors are defined. If a protection table entry has an error fetching an associated control block, there is a mechanism of reporting this error in a way that only affects the resource that has the error, for example, a memory region ("MR"). Another such affiliated error occurs when the LPAR IDs for various associated HCA resources do not match. The event queue records errors from all HCA resources including QPs, CQs, EEs, and MRs. Errors in the event queues are reported to the hypervisor's event queue, except for errors in the hypervisor's event queue.

In order to limit the space required in the event queue for affiliated asynchronous errors, each resource can cause only one error entry into the EQ. Once the error is detected, the resource goes into the error state, and it cannot present another error to the EQ. The error type(s) is indicated in the resource's table entry (in its context) and is not included in the EQ entry. Once the HCAD determines that the EQ entry is for an error, it has to read information from the HCA resource to determine the type of error(s) and the appropriate logging and recovery action to take. The design accommodates additional error types required by the specific implementation. As part of the recovery action, the EQ entry is logically removed, and the resource is reset allowing it to generate the next affiliated asynchronous error.

For unaffiliated asynchronous errors, such events are reported in the hypervisor's EQ. Port errors are associated with a particular HCA port number. Hardware interrupts for unaffiliated asynchronous errors may be broadcast to multiple processors through a multi-event queue link mechanism.

When the HCA detects a completion event or CQ error, it looks at the completion event queue number in the CQTE to determine which event queue to use. When an affiliated asynchronous event or error is detected, it looks in the EQ number in the QPTE. If only one queue is to be used for both completion events and CQ errors, and affiliated asynchronous events and errors, the values of the event queue number in the CQTE and QPTE are the same. For global events such as a port state change and for P/Q_Key mismatches, path migrating, link integrity, buffer overruns, and sampling mechanism completions, the hypervisor's EQ (EQ0) is used. Before the event or error is put onto the EQ, the LPAR ID for the EQ must be valid, the EQ must be enabled, and the EQ must not be in the error state. Then the LPAR ID of the resource (QP, CQ, EE) is compared to the LPAR ID of the EQ. The EQ is updated only if the LPAR IDs match each other. If any of the above conditions is not met (the EQ is not in the correct state, the LPAR IDs do not match, etc.), an error event is put on the hypervisor's EQ.

If the enable completion event generation control bit is set, completion events generate EQEs. Otherwise, EQE generation is inhibited. Once an event or error has been put on the event queue (if required) and if the secondary summary byte is enabled, the secondary summary byte is stored into the LPAR's main memory. Software may dynamically enable or disable the secondary summary byte at any time. Next, if the primary summary byte is enabled and no hardware interrupt is to be generated, the primary summary byte is stored into the hypervisor's main memory. After any summary bytes are stored, the HCA may generate a hardware interrupt to a processor node. Each of the actions described above must take place in a strictly serialized fashion. In other words, before the next action is taken each store into main memory must be completed, as observed by any program running on any processor.

Note that any combination of EQ enable bits (store EQE, secondary summary byte, primary summary byte, generate hardware interrupt) is valid. For example, in a low end system implementation where there are only a few CQs, a summary and/or interrupt may be desired for completion events without generating an EQE.

The HCAD completion event handler and affiliated asynchronous event handler run in privileged mode. When interrupted, the HCAD examines its head index to determine where to start looking in the EQ. If the valid bit in the entry is 'logically' off, the HCAD assumes an over-initiative case and returns control. If the valid bit is 'logically' on, the HCAD takes the appropriate action.

For hypervisor events, the hypervisor operates in much the same way as the HCAD, but the interrupt timer and summary bytes are disabled. The hypervisor may enable the multi-event queue link. The multi-event queue link register points to the next EQ to process with the same information as the present EQ.

The HCAD and the interrupt handler functions may run as a separate process from the completion event and asynchronous event handlers. In this case, when the interrupt handler examines the head of the EQ and finds a valid event, it logically removes the EQE from the EQ. Using the valid bit toggle function, the HCAD does not physically reset the EQE valid bit, but it must keep track of where in the circular EQ the HCA toggles the valid bit. Next, if the event is a completion event, the interrupt handler will reenable the CQ by resetting the EQ Pending bit in the CQTE, ensure that the EQ Pending bit is reset in the HCA, and then call the completion event handler. If the event is not a completion event, the interrupt handler may have to read status from the HCA before reenabling the particular event. It is possible for some system environments to have a layer of firmware and/or hardware in the processor node that processes the hardware interrupt and dispatches the appropriate LPAR. In such case, the operating systems interrupt handler is then invoked.

Once the completion event handler (the HCAD) is called, it uses the CQ token to process the CQ. At this time, the consumer process can process any number of pending CQ entries using the poll verb. After the consumer is finished processing the completion event(s), it increments the CQ free entry count by the number of CQEs consumed.

The design point of the CQs and EQs optimizes for running the interrupt and completion event handlers as separate processes by having the EQ Pending bit and CQ free entry count adder register in different memory manager input output ("MMIO") doublewords.

Reference will now be made to the allocation of event queues. Multiple EQs are supported by multiple LPARs. Each LPAR can have one or more HCA resources, and each resource is associated with a single CQ. Also, each LPAR may have multiple CQs. In any case, a CQ is associated with a single EQ. Also, each LPAR may have more than one EQ. Multiple EQs per LPAR are available, but an average of four per LPAR generally suffices. All CQs associated with an EQ must be in the same LPAR. In other words, EQs cannot be shared by LPARs, except for the hypervisor's EQ. The total number of EQs depends on the total number of CQs and the total number of LPARs.

Figure 1:
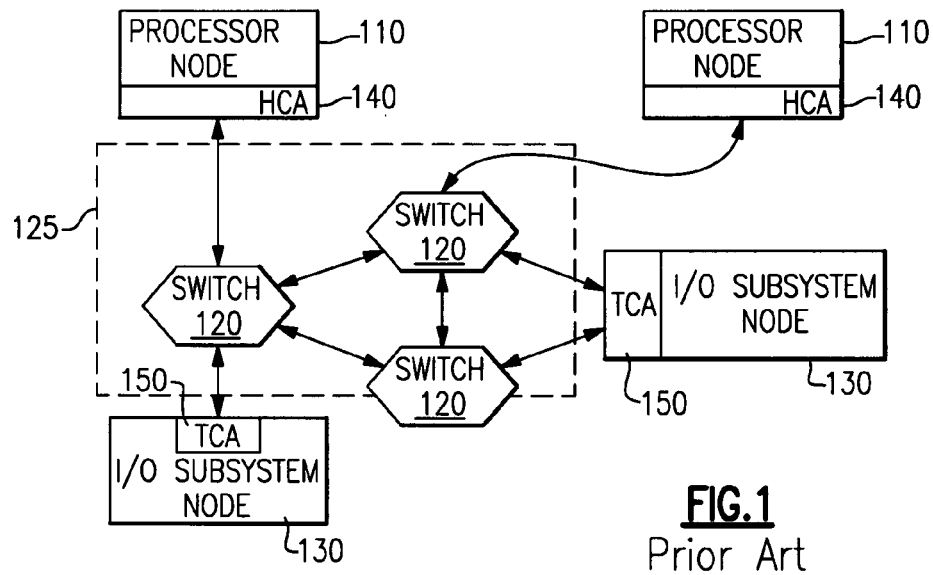
FIG. 1 illustrates a prior art system area network in accordance with Infiniband architecture.
Figure 2:
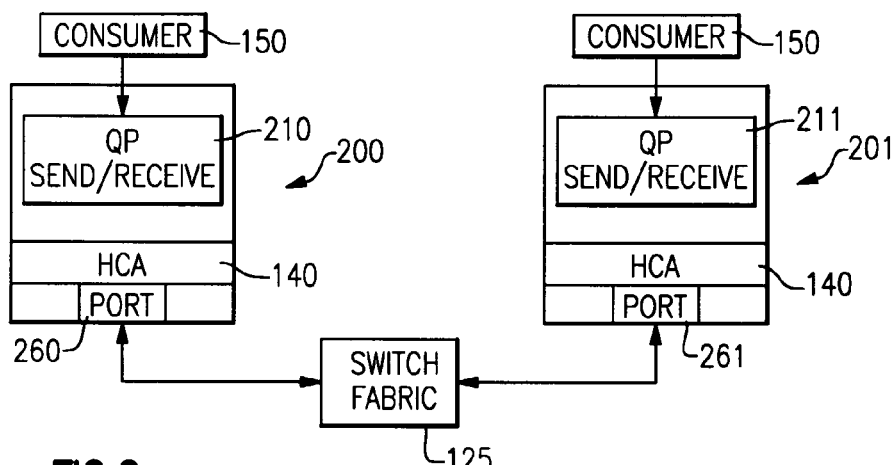
FIG. 2 is a prior art diagram illustrating processor-to-processor communications in accordance with InfiniBand architecture.

In one embodiment of the invention, a special mode of operation is provided in which events are presented on a different event queue than that on which they are usually presented. In such embodiment, a defined unit of the information processing system, e.g., a processor node 110 (FIG. 1) is operated in a special mode in which events of particular types or events involving particular types of system resources are all recorded on a single event queue. Such embodiment can be used advantageously for debugging problems which occur upon initial testing of system configurations involving new hardware, firmware, and/or software. For example, in such special mode events involving all of certain system resources can be recorded on a particular event queue "EQ0" on which events requiring the attention of a high-privileged program, e.g., a hypervisor, are normally recorded.

The special mode of operation preferably can be turned on and turned off as needed for diagnostic purposes, such as needed, for example, to support diagnosis of a problem under investigation. By recording all events involving certain system resources on a single event queue, information regarding the order of occurrence of the events is obtained and preserved as a diagnostic aid. The order in which events are recorded on an event queue reflects the order in which the events actually occur. This remains true except for events which occur nearly simultaneously, in which case, the exact order of occurrence of such events may not be as important. By recording events involving a larger than usual set of system resources on a particular event queue, or involving a different set of system resources than usual, problems may be more easily debugged because information is preserved concerning the times at which the events occur.

This embodiment provides flexibility in the selection of particular system resources to be reported on a particular event queue in the special mode. For example, a system administrator or a program can select all events for particular system resources to be reported on an "EQ0" event queue on which events requiring the attention of a high-privileged program, e.g., a hypervisor, are recorded. In another example, when a particular information processing system is partitioned to support multiple LPARs, another way in which this facility can be used is for all events involving certain system resources of a particular LPAR to be recorded on a single event queue assigned to that LPAR. As a way of facilitating the diagnosis of problems within the LPAR, it can be arranged for certain types of events of most interest that relate to completions, state changes and errors to be recorded in the single event queue during the special mode, and recorded on other event queues when the special mode is not active. In certain large-scale information processing systems, each LPAR is assigned multiple event queues in which events having different priority levels are normally recorded on different event queues. In such systems, it can be arranged during the special mode for all error events involving system resources assigned to the LPAR to be recorded on the event queue having the highest priority level, in addition to other events involving state changes and completions. On the other hand, for information processing systems which have smaller scale, it may be desirable for all error events to be recorded on the event queue EQ0 on which events requiring the high-privileged program's attention are recorded.

Referring back to FIG. 5, some concepts about the EQPT can now be discussed in greater detail. The EQPT is initialized by the HCAD before the "Set Completion Event Handler" verb is executed for EQs that have only completion events, or when the "Set Asynchronous Event Handler" verb is executed, for EQs that have only asynchronous events. Alternatively, the EQPT is initialized when both verbs are executed for EQs that have both types of events. The EQPT is located in kernel memory. It should be noted that user mode software needs no access to the EQPT.

As shown in FIG. 5, the EQPT contains a list of pointers. Each pointer is either an EQ page pointer or an EQ link pointer, and the type of pointer is indicated by the link bit (bit 63). Each EQ link pointer also includes a toggle bit (bit 62) to control how the HCA sets the valid bits in the EQEs. The EQE valid bit (bit 0) is set to the value of the EQE valid value bit (bit 62) in a register. The value in this register is toggled (complemented, or "flipped") each time the HCA fetches an EQ link pointer in which the toggle bit (bit 62) is set. With this function, the HCAD does not have to reset the EQE valid bits as it dequeues the entries, thus improving performance. In addition, if the software does not use the toggle function, it must reset the valid bits and be aware of additional synchronization requirements between it and the HCA.

Tables 1 and 2 shown below provide information about the structure of an event queue page table ("EQPT"). Each entry in the EQPT preferably has length of one double-word ("dword"), i.e., eight bytes or 64 bits. The EQPT contains a set of "n" EQ page pointers and preferably includes one EQ link pointer that points to the beginning of a next EQPT in a series on EQPTs on which EQ page pointers are found.

TABLE 1

EQPT

| EQPT dWord | Byte 0 | Byte 1 | Byte 2 | Byte 3 | Byte 4 | Byte 5 | Byte 6 | Byte 7 |
|---|---|---|---|---|---|---|---|---|
| 0 | | | | 1st EQ Page Pointer | | | | |
| 1 | | | | 2nd EQ Page Pointer | | | | |
| 2 | | | | 3rd EQ Page Pointer | | | | |
| . | | | | . | | | | |
| . | | | | . | | | | |
| n-1 | | | | nth EQ Page Pointer | | | | |
| n | | | | EQ Link Pointer | | | | |

TABLE 2

EQPT Entries

| Field | Bits | Description |
|---|---|---|
| EQ Page Pointer | 0:51 | Real address pointing to beginning of page of EQ entries. |
| | 52:61 | Reserved, set to zero (HCA ignores these bits) |
| | 62 | Reserved, set to 0 |
| | 63 | Link bit set to 0 |
| EQ Link Pointer | 0:60 | Real address pointing to beginning of EQPT |
| | 61 | Reserved, set to zero |
| | 62 | 0 = Do not toggle EQE Valid Value<br>1 = Toggle EQE Valid Value |
| | 63 | Link bit set to 1 |

Table 1 indicates the byte definitions that relate to EQPT. In one embodiment of the present invention, each EQ page pointer addresses a 4 K page that comprises part of the EQ and contains 512 event queue entries (EQEs). The EQ link pointer contains a real address that points to the beginning of the next EQPT. The next EQPT may be the same EQPT when all the EQ page pointers are contained in a single EQPT, or it may be another EQPT, when several EQPTs are required to make up the EQ. Referring again to FIG. 5, the embodiment illustrated shows an example of how several EQPTs 510 (EQPT0, EQPT1 and EQPT2) can be linked to form large EQs through use of EQ link pointers. In order to optimize the performance of EQ processing, the number of EQ link pointers should be kept to a minimum such that few lookups are required to locate an EQ page.

In Table 2, the contents of one EQ page pointer in the EQPT are shown, and the contents of one EQ link pointer are shown. The EQE valid toggle bit of the EQ link pointer provides the capability to invert the polarity of the EQE valid bit every time the EQ is wrapped. Use of the EQE valid toggle bit is the preferred mode of operation. If the EQ toggle facility is not used, great care must be taken to maintain synchronization between the HCA and the HCAD. The entries in the EQPT are initialized by the HCAD when the Create_EQ verb is executed. The HCA reads the entries in the EQPT during event processing when a new EQ page pointer is needed.

Each EQTE is comprised of multiple registers, in one embodiment of the present invention. In this embodiment, these registers are the first four registers in the memory map and their offsets are the same for all resource types (QPs, CQs, and memory region MRWPTs). This allows consistent initialization and teardown by the hypervisor for all resource types. Each EQ Table must have multiple EQTE's each of which comprises the registers referenced in Table 3 below.

In the embodiment provided above, each of these registers must have the format as referenced in this table.

TABLE 3

EQ Table Entry

| Attribute | Mem Space | Source | When Updated | Register Name |
|---|---|---|---|---|
| EQ LPAR ID | S | Hypervisor | Create EQ | EQx_HCR |
| EQ Hypervisor Controls | S | Hypervisor | Create EQ | EQx_HCR |
| EQ Control | S, R, P | HCAD HCAD HCA HCA HCA | Create EQ Destroy EQ Disable EQ EQ Proc. Error | EQx_C |
| EQ Hardware Error | S | Hypervisor HCA | Recovery Error | EQx_HERR |
| EQ Affiliated Error Register | S, R, P | HCAD HCA | Recovery Error | EQx_AER |
| EQ Page Table Pointer | S, R | HCAD HCAD HCA | Create EQ, Resize EQ EQ Proc. | EQx_PTP |
| EQ Tail Pointer | S, R | HCAD HCA | Create EQ EQ Proc. | EQx_TP |
| EQ Secondary Summary Byte Address Register | S, R | HCAD | 'Modify' EQ | EQx_SSBA |
| EQ Primary Summary Byte Address Register | S | Hypervisor | Create EQ | EQx_PSBA |
| EQ Completion Event Counter | S, R, P | HCAD HCA | Create EQ EQ Proc. | EQx_CEC |
| EQ Multi-Event Queue Link Register | S, R, P | HCAD | Create EQ | EQx_MEQL |
| EQ XI Source Base Index Register | S | Hypervisor | Create EQ | EQx_XISBI |
| EQ XI Source Control Register | S | Hypervisor | Create EQ | EQx_XISC |
| EQ Interrupt Timing Register | S, R, P | HCAD HCA | 'Modify' EQ EQ Proc. | EQx_IT |

Table 3 indicates the different types of memory spaces in which each attribute of an EQ Table entry is stored. Thus, some attributes are stored in "super-privileged" ("S") spaces which can only be accessed and changed by a program having high privileges such as a hypervisor. Other attributes are accessible in "real address" ("R") memory spaces, which permits a greater number of programs to access and change such attributes. Still other attributes are stored in "privileged" memory spaces ("P") which are accessible by an operating system having been granted access thereto. The "when updated" field indicates the times at which a change to a particular attribute of the EQ Table Entry is permitted. As shown in Table 3, some types of attributes such as "EQ LPAR ID" can only be updated at the time that an event queue is first created via a "Create EQ" function of the hypervisor.

A discussion about the EQTE initialization and access may be useful. All EQTE fields, except the super-privileged fields are initialized by the HCAD when the EQ is created. The super-privileged fields are initialized by the hypervisor prior to the EQ being allocated to the HCAD. The hypervisor must initialize certain registers prior to allowing the HCAD access to the EQ. In addition, the HCAD must initialize the EQTE as follows:

The EQPT pointer is set to the real address of the page that contains the top of the EQ. The HCAD must wait for the PTP update to complete, as indicated by a PTP-update-status bit in a register. The writing of that register will cause the HCA to update another particular register with the tail pointer referencing the top of the EQ.

After all the preceding steps have been completed, the EQ enable bit is set to 0b'1'. The HCA accesses the EQTE by indexing into the EQ Table by the EQ Number.

TABLE 4

Event Queue Entry

| Bit | FUNCTION | | |
|---|---|---|---|
| 0 | Valid (0 or 1 depending on state of the EQE Valid Value bit, EQx_PTP bit 62) | | |
| 1 | Completion Event* 0 = Not Completion Event Bits 2:7 defined below 1 = Completion Event, Bits 2:7 QP/CQ Number = CQ Number Resource Identifier = CQ Token Bits 2:5 = Reserved Bits 6:7 = 0b00 = Reserved Bits 6:7 = 0b01 = EQ Empty of Completion Events. Bits 6:7 = 0b10 = EQ NOT Empty of Completion Events & Current Time > Next Interrupt Time Stamp. Bits 6:7 = 0b11 = EQ NOT Empty of Completion Events & Current Time <= Next Interrupt Time Stamp. | | |
| 2:7 | Event/Error Identifier | QP/CQ Num | Resource Identifier |
| | 0x00 = Reserved | NA | NA |
| | 0x01 = Reserved | NA | NA |
| | 0x02 = Path Migrated * | QP Number | QP Token |
| | 0x03 = Communication Established * | QP Number | QP Token |
| | 0x04 = Send Queue Drained * | QP Number | QP Token |
| | 0x05 = QP Error * | QP Number | QP Token |
| | 0x06 = QP Error | QP Number | QP Token (EQ0) |
| | 0x07 = CQ Error | CQ Number | CQ Token |
| | 0x08 = CQ Error | CQ Number | CQ Token (EQ0) |
| | 0x09 = MRWPTE Error | NA | L_Key/R_Key (EQ0) |
| | 0x0A = Port Event* | NA | Physical port number (EQ0) |
| | 0x0B = MR Access Error | NA | L_Key/R_Key |
| | 0x0C = EQ Error | NA | EQ number (EQ0) |
| | 0x0D = P/Q_Key mismatch | NA | Physical port number (EQ0) |
| | 0x0E = Reserved | NA | NA |
| | 0x0F = Reserved | NA | NA |
| | 0x10 = Sampling Complete | NA | Sampling Mechanism ID (EQ0) |
| | 0x11 = Unaffiliated Access Error | NA | NA (EQ0) |
| | 0x12 = Path Migrating | QP Number | QP Token (EQ0) |
| | 0x13 = Interface Trace Stopped | NA | NA (EQ0) |
| | 0x14 = First Error Capture Info | NA | NA (EQ0) |
| | 0x15 = SRQ Limit * Available | QP Number | QP Token |
| | 0x16 to 0x2F = Reserved | NA | NA |
| | 0x30 to 0x3F = Reserved for HCAD | NA | NA |
| 8:31 | QP/CQ Number (8:31) QP Number (8:31) CQ Number | | |

TABLE 4-continued

Event Queue Entry

| | |
|---|---|
| 32:63 | Resource Identifier |
| | (32:63) QP Token (4 bytes) |
| | (32:63) CQ Token (4 bytes) |
| | (32:63) L_Key/R_Key (4 bytes) |
| | (56:63) Port Number (1 byte) |
| | (48:63) EQ Number (2 bytes) |
| | (48:63) Sampling Mechanism ID (48:55 = Mechanism Number, 56:63 = Port Number) |

Table 4 illustrates the format of an event queue entry. For the path migrating event, the target EQ and type of resource identifier is controlled by an EQ use control bit.

As discussed above, IBA defines several types of events and errors, and the HCA uses event queues (EQs) to register them. All events and errors are processed by event handlers, and these handlers run in privileged mode. Completion events are processed by a completion event handler and are associated with a particular completion queue (CQ); they signal that a CQE was placed on the CQ. Affiliated asynchronous events and errors are processed by an asynchronous event handler and are associated with a particular HCA resource (QP, CQ, EE, MR). Such errors also signal various conditions. Unaffiliated asynchronous errors are also processed by the asynchronous event handler and cannot be associated with any particular HCA resource; they signal more global events such as a port failure, and they are part of the hypervisor.

The hypervisor also processes other HCA events and errors such as P/Q_Key mismatches, link integrity errors, link buffer overruns, and sampling mechanism completions. Each HCA may have multiple event queues, one or more per LPAR. Most event queues are handled like any other HCA resource in that they are allocated to a particular LPAR. However, global events such as a port down condition, certain EQ LPAR ID mismatch errors, etc. are signaled to the hypervisor's EQ (EQ0). The size of an EQ must be large enough to contain the total number of events for all associated HCA resources (QPs, CQs, EEs, MRs, and global). For example, each CQ has a completion event and an affiliated asynchronous error, each QP has three IBA defined affiliated asynchronous events and a single affiliated asynchronous error, MRs have an affiliated asynchronous error, and global resources have unaffiliated asynchronous errors such as port errors.

When the HCA posts an EQ Entry (EQE), it may set one or two summary bytes in main memory and generate hardware interrupt(s) to the processors. The hardware interrupt mechanisms operate slightly differently in some server architectures, but all platforms use time stamps to throttle hardware interrupt generation.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. An information processing system, comprising:
a plurality of event queues, each event queue of the plurality of event queues having a maximum number of entries;
a plurality of logical partitions ("LPARs"), each of said plurality of logical partitions assigned to one or more event queues of the plurality of event queues;
a plurality of system resources assigned to one or more logical partitions of said plurality of logical partitions;
said plurality of event queues being operable to record events regarding said system resources assigned to said logical partitions; and
an event recording mechanism operable to make entries regarding events in one of said event queues, wherein said entries are limited to a predetermined number of active entries in one of said event queues per each type of event per each of said system resources.

2. The information processing system as claimed in claim 1, wherein said predetermined number is one.

3. The information processing system as claimed in claim 2, wherein said event recording mechanism is operable to make an entry in one of said event queues only when no valid entry already exists in one of said event queues regarding an identical type of event for an identical one of said system resources.

4. The information processing system as claimed in claim 1, further comprising a plurality of privileged resources and a privileged resource controller operable to control an allocation of said privileged resources, wherein at least one of said event queues is assigned for recording events related to said privileged resources.

5. The information processing system as claimed in claim 1, further comprising a hypervisor operable to monitor a plurality of global events, at least one of said event queues being a global event queue dedicated to recording said global events, said hypervisor being including a global event handler operable to monitor entries of said global event queue to handle said global events.

6. The information processing system as claimed in claim 1, further comprising an event handler operable to handle said events by referring to said entries of one of said event queues in an order in which said entries are recorded in said event queue by said event recording mechanism.

7. The information processing system as claimed in claim 6, further comprising a host channel adapter ("HCA") and a host channel adapter driver ("HCAD"), said HCAD including said event handler.

8. The information processing system as claimed in claim 6, wherein said event recording mechanism is operable to utilize a first pointer to one of said event queues for making entries in one of said event queues and said event handler is operable to independently utilize a second pointer for handling entries recorded in one of said event queues.

9. The information processing system as claimed in claim 8, wherein said entries of one of said event queues include information identifying an active or inactive state of said entries.

10. The information processing system as claimed in claim 8, further comprising a completion queue containing entries regarding events handled by said event handler, wherein said event handler is further operable to reset an active state of a given entry in said completion queue upon completing handling of an event recorded by said given entry, and said event recording mechanism is further operable to record a new entry in one of said event queues for an identical type of event as said given entry and for an identical one of said system resources as said given entry only after said active state has been reset.

11. The information processing system as claimed in claim 10, wherein said event handler is operable to toggle an assignment of meaning of said identifying information between a first assignment in which a first value represents said active state and a second assignment in which said first value represents said inactive state.

12. The information processing system as claimed in claim 1, wherein one of said event queues is circular and one of said event queues maintains a time-ordered sequence of said entries.

13. The information processing system as claimed in claim 1, wherein said predetermined number of active entries in one of said event queues assures that said event recording mechanism cannot overrun a location in one of said event queues at which said entries are consumed from one of said event queues.

14. The information processing system as claimed in claim 13, wherein said event recording mechanism is assured of not overrunning said location in one of said event queues without communication from a consumer of said entries.

15. A method of processing events in an information processing system comprising a plurality of system resources, a plurality of event queues and a plurality of logical partitions ("LPARs"), the method comprising:

assigning said plurality of system resources to one or more partition of said plurality of logical partitions;

providing an event queue of said plurality of event queues to each of said logical partitions, the provided event queues comprising an event queue having a maximum number of entries;

recording entries regarding events in said event queue, wherein said entries are limited to a predetermined number of active entries in said event queue per each type of event per each of said plurality of system resources; and recording events regarding said system resources assigned to respective ones of said logical partitions on said provided event queues.

16. The method as claimed in claim 15, wherein an entry is recorded in said event queue only when no valid entry already exists in said event queue regarding an identical type of event for an identical one of said plurality of system resources.

17. The method as claimed in claim 15, wherein said information processing system further includes a plurality of privileged resources and a privileged resource controller, said method further comprising allocating said privileged resources by said privileged resource controller, and providing at least one of said event queues for recording events related to said privileged resources.

* * * * *